June 13, 1944. H. HAMMEREN 2,351,509
TANK CONSTRUCTION
Filed April 8, 1943 5 Sheets-Sheet 5
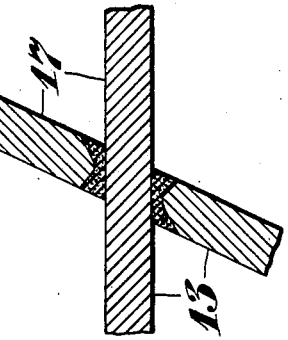
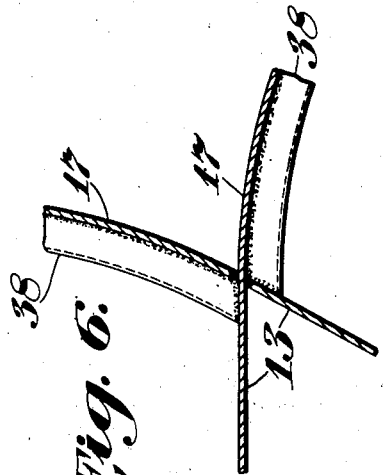
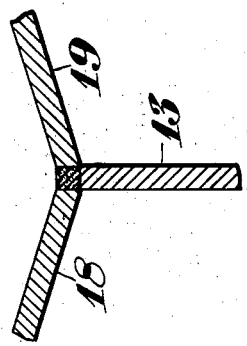
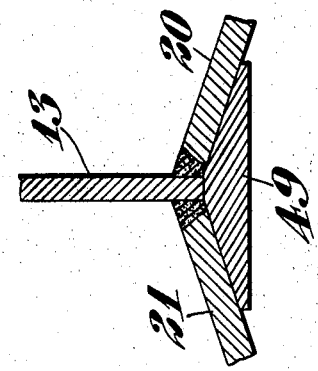
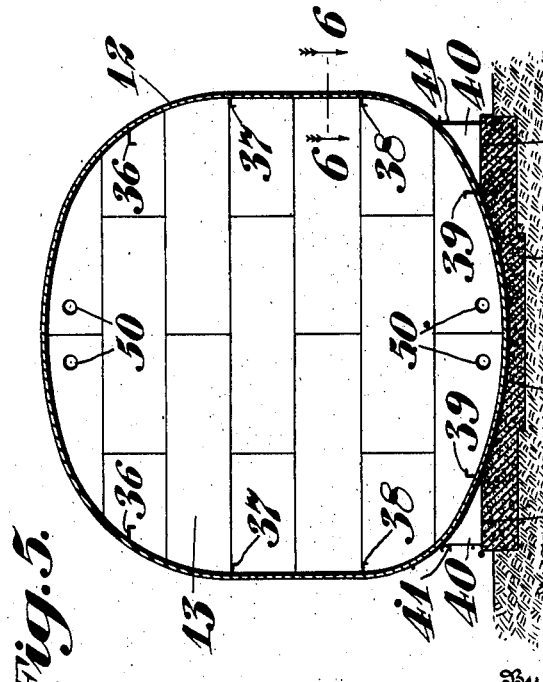
Inventor
Hans Hammeren
By R. S. A. Dougherty
Attorney Patented June 13, 1944

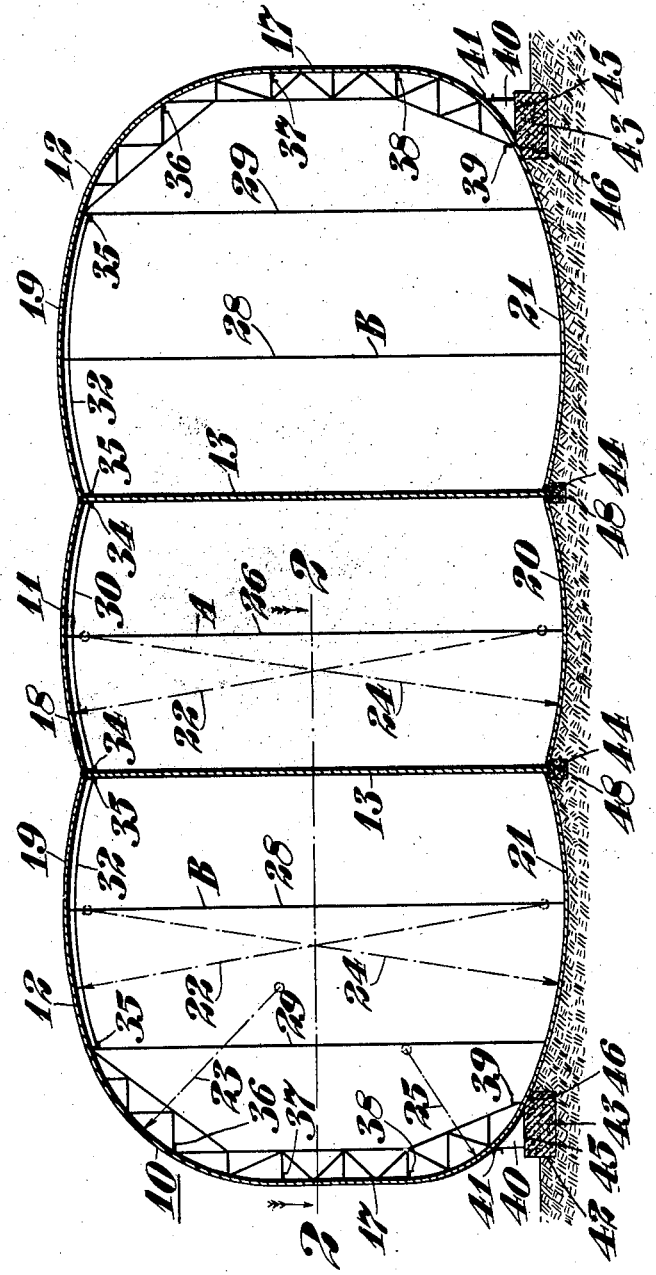

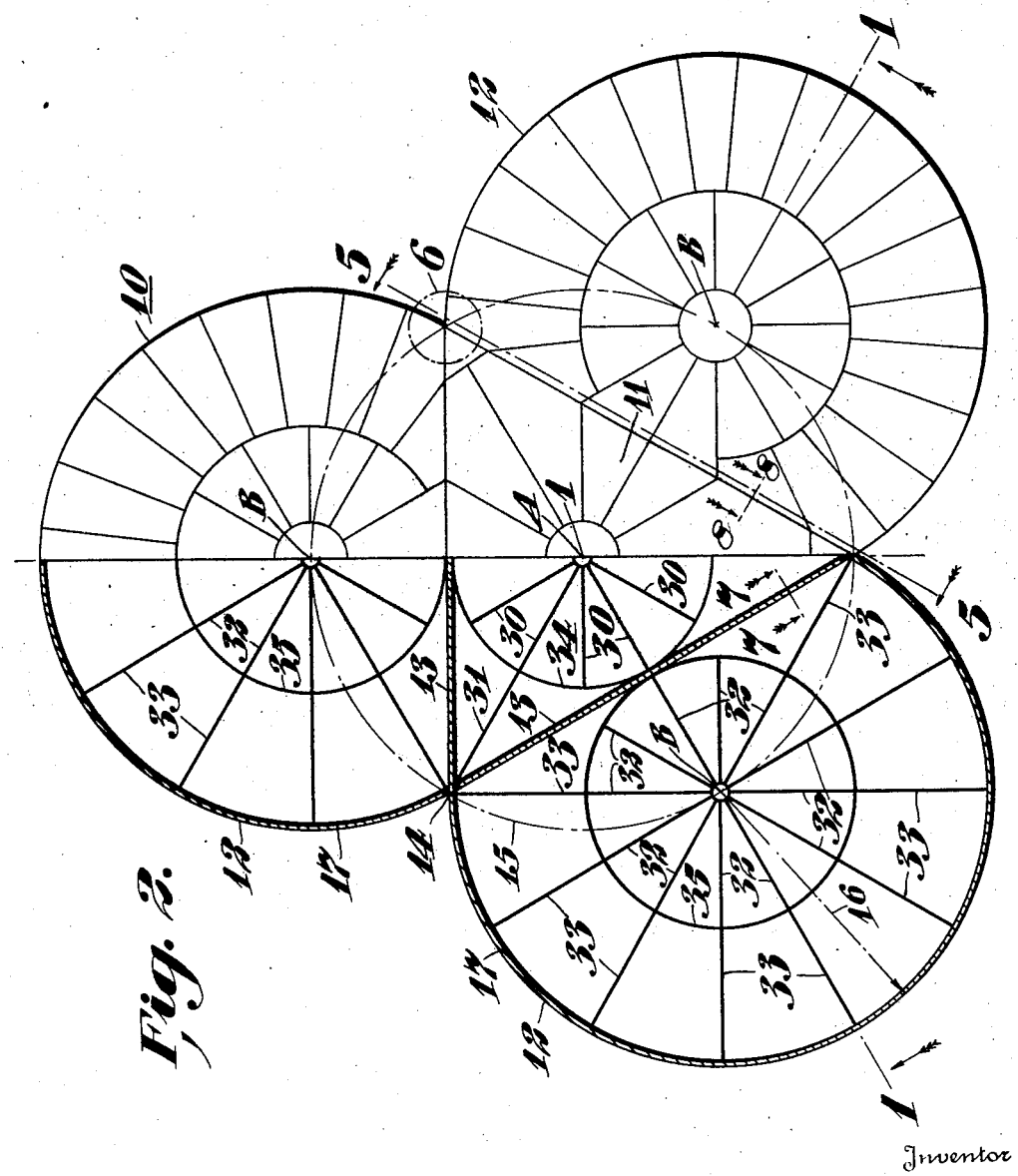

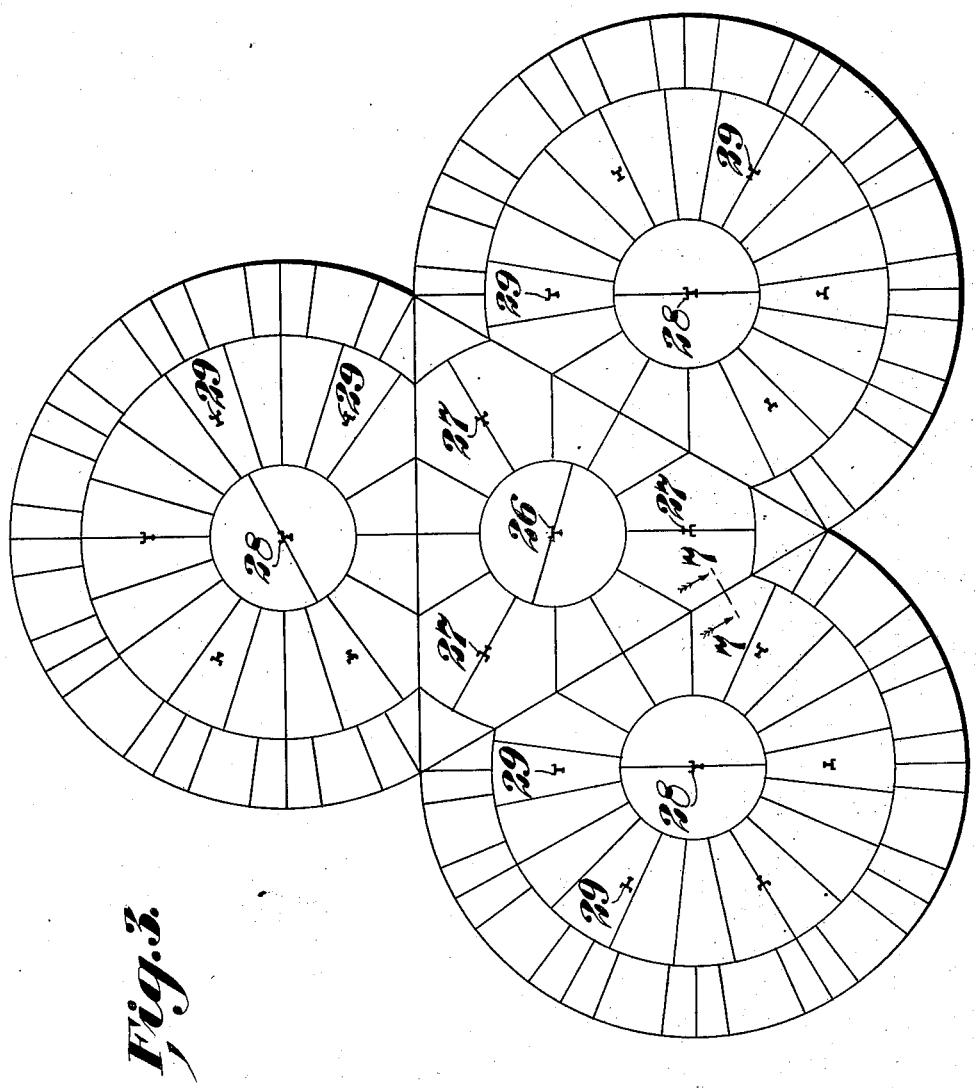

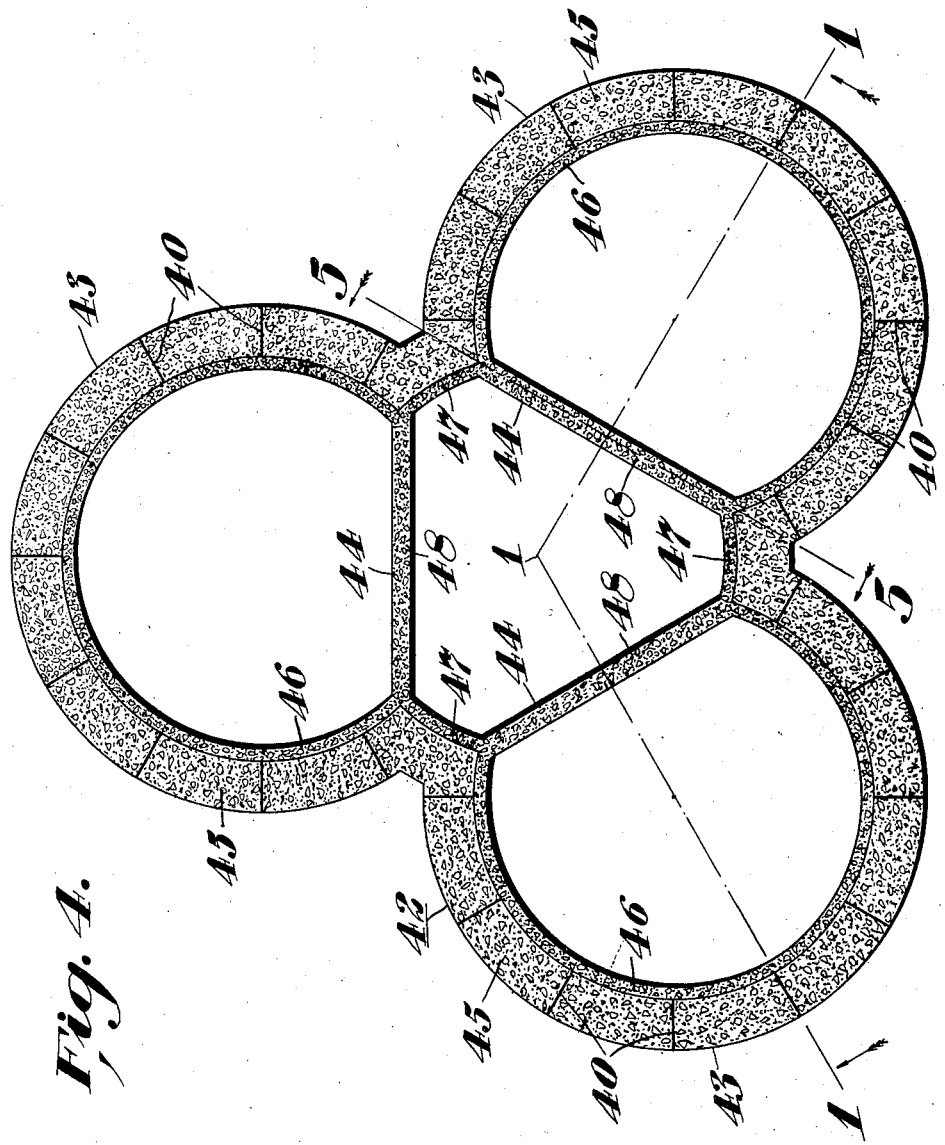

2,351,509

UNITED STATES PATENT OFFICE 2,351,509

TANK CONSTRUCTION

Hans Hammeren, Bethlehem, Pa., assignor to Bethlehem Steel Company, a corporation of Pennsylvania Application April 8, 1943, Serial No. 482,282

6 Claims. (Cl. 220—18)

My invention has reference to improvements in the design of the structural arrangement of sheet metal tanks of relatively large storage capacity especially designed to store gases, liquids, and the like in bulk under pressure.

A well-known type of large storage tank is the familiar one of the oil fields having a generally cylindrical body structure with top and bottom plate closures of either substantially flat, conical, or semispherical contours. But these well-known designs have a practical limitation of over-all diameter beyond which it is not economical to go: first, by reason of the heavy thickness of plates then required to prevent deformation due to fluid pressures, and second, by the excessive costs of fabricating and welding, or riveting, such heavy plates into a unified structure.

It is the especial object of my invention to provide a cellular type tank construction adaptable for fluid storage of more than usual capacity, and of simple and practical design within the engineering limitations of such structures, whereby such tanks may be more expeditiously and economically manufactured.

It is an object of my invention to provide a cellular type tank construction of relatively large capacity wherein the plate thickness required to resist fluid pressures is no greater than in a known cylindrical type of tank construction of considerably smaller capacity, and that the comparative volumes of the two respective types of construction for the same plate thickness required therein is approximately of the order of 2.8:1.

It is an object of my invention to provide a tank construction adaptable for fluid storage of more than usual capacity characterized by the substitution for the usual cylindrical exterior peripheral wall of an exterior peripheral wall comprised of a plurality of segmental lobes of novel characteristics as hereinafter described and claimed.

It is a further object of my invention to provide a cellular tank construction comprising a central equilateral triangular cell surrounded by three segmental cells wherein the vertical walls of said triangular cell each comprises a chordal wall of said segmental cell, and further characterized as hereinafter described and claimed.

Other objects and advantages will be apparent from the following description, wherein reference is made to the accompanying drawings illustrating the preferred embodiment of my invention and wherein similar reference numerals designate similar parts throughout the several views.

Figure 1 is a cross-section of my improved tank construction taken along the lines 1—1—1 of Figures 2 and 4;

Fig. 2 to the left of the indicated center-line is a plan view with the tank plating removed and showing the interior reinforcing and supporting members diagrammatically, and showing the tank plating in cross-section along the line 2—2 of Figure 1; and, to the right of the indicated center-line is a plan view of Figure 1 showing the top plating thereof;

Fig. 3 is a diagrammatic view of the bottom plating with top plating and all interior reinforcing and supporting members, except supporting columns, removed;

Fig. 4 is a plan view of the supporting foundation of Figure 1 with the tank removed;

Fig. 5 is a vertical cross-section taken along the lines 5—5 of Figures 2 and 4;

Fig. 6 is a cross-section taken along the line 6—6 of Figure 5 and within the region of the circle 6 of Figure 2;

Fig. 7 is a cross-section taken along the lines 7—7 of Figures 2 and 3;

Fig. 8 is a cross-section taken along the line 8—8 of Figure 2; and

Fig. 9 is an enlarged detail view of Figure 6 with reinforcing members removed.

Referring now to the drawings, the numeral 10 designates the tank construction which comprises the central equilateral triangular tank cell 11 and the three surrounding segmental tank cells 12.

Consideration of the Figures 1, 2 and 5 discloses that my arrangement of tank construction is based on a definitive geometrical design wherein the component cells 11 and 12 are basically structurally correlative though modified by their relationship in the complete tank structure. In plan, my cellular arrangement is characterized by having each vertical enclosing wall 13 of the central equilateral triangular cell 11 comprise the closing chordal wall 13 of a respectively adjacent segmental cell, and that the vertices 14 of said triangular cell and the centers B of said segmental cells lie at equal distances alternately on a constructional circle 15 whose center is the geometric center A of said tank construction 10 and of said triangular cell 11. This definitive relationship of the cells results in the further characteristic that the radii of the vertices from their geometric center A is equal to that of the radii 16 of the segmental cells 12, and furthermore that said vertices 14 mark the point of intersection on said constructional circle 15 of adjacent segmental cell boundary walls 17. It is also characteristic, therefore, that the walls 13 lie midway of and normal to a line connecting the center A and their respective segmental cell centers B. It is obvious then that the diameter of the constructional circle 15 is equal to the diameter of the segmental cell walls 17.

It will now be apparent that with the above characteristics I am able to make the surface contours of the top walls 18 and 19, and of the bottom walls 20 and 21, of the cells 11 and 12 respectively, correlative surfaces of revolution about the respective vertical axes A and B of the cells 11 and 12. I prefer to make these surface contours oval in cross-section having for the top walls constructional radii 22 and 23 and for the bottom walls constructional radii 24 and 25.

As a structural result of my arrangement of tank construction having the characteristics as hereinbefore set forth, it is a concomitance that the exterior walls 17, 19, and 21 of the cells 12, and the exterior walls 18 and 20 of the cell 11, will intersect each other respectively along coincidental points in the vertical plane of the respective walls 13 and will thus demarcate the boundary periphery of said walls 13 as shown in Figure 5.

By welding the respective wall edges along these coincidental points of intersection, preferably as shown in Figures 6, 7, 8 and 9 I provide a structurally integral tank characterized by having each exterior segmental cell wall 17 structurally united tangentially to an interior diaphragm wall 13; whereby the tangential stresses in the walls 17 caused by the fluid forces within the cells 12 are balanced axially in the walls 13.

It is to be understood, of course, that the metal plates comprising the walls 13, 17, 18, 19, 20 and 21 are each in themselves welded up of a plurality of plates in a manner well known in the art, and which I have indicated variously in Figures 2, 3, and 5. It is also to be understood that though I have indicated welding as the preferable means of combining plates other well known conventional means such as riveting and bolting may be employed and be within the scope of my invention.

It will be recognized from the geometrical layout of my tank construction 10 as shown in Figure 2, and characterized in the specification hereinbefore, that the cross-sectional area thereof may be expressed as a function of the radius 16 of a segmental cell 12. It will be further recognized that this area when compared to the cross-sectional area of a cylindrical tank having the same radius as that of a segmental cell 12 may be expressed as a ratio of constant value. This ratio is approximately 2.8:1.

It is well known in the art that the plate thickness of circular fluid storage tanks is determined from the radial fluid forces imposed thereon and that the plate thickness required is proportional to the radius of the tank wall. It follows therefore that in my design of tank structure I provide a tank having a comparative capacity of two-and-eight-tenths times that of a cylindrical tank of equal plate strength.

In order to provide additional rigidity and support to my tank construction I provide reinforcing, bracing, supporting, and strengthening means preferably as follows: For the roof of the cell 11 I provide the central column 26 and positioned radially thereof I provide the columns 27. For the roof of the segmental cells 12 I provide the central colums 28 and the radially positioned columns 29. For additional roof support I provide the rafters 30 and 31 for the cell 11, and for each cell 12 I provide rafters 32. In each segmental cell 12 I provide trusses 33. In the cell 11 I provide the roof reinforcing ring 34, and in each cell 12 the ring 35. Also in each cell 12 are the circular reinforcing rings 36, 37, 38 and 39 which are cut off at their points of intersection with the walls 13 and are welded thereto in a manner as shown in Figures 5 and 6.

Suitably attached, as by welding, riveting and the like, to the exterior of the bottom plates 21, in the vicinity of the knuckles formed at the radii 25, and spaced at suitable intervals about the horizontal circumference thereof are the tank supporting brackets 40. The brackets 40 are reinforced by the circular drip ring 41 suitably attached thereto and to the bottom plates 20 and 21, as by welding, riveting or the like. The rings 41 will be suitably united at their respective points of intersection in the vicinity of the vertices 14 on the exterior of the bottom plate 20.

For suitable ground support for the tank 10 I provide preferably a ferro-concrete unitary foundation structure 42 (see Figures 1, 4 and 5) comprising the segmental circular sills 43 and the strut members 44. The surfaces 45 of the sills 43 support the brackets 40, while the surfaces 46 thereof support directly adjacent portions of the bottom plates 21. The surfaces 47 of the sills 43 and the inner half of the surfaces 48 of the struts 44 support directly adjacent portions of the bottom plate 20; while the outer half of the surfaces 48 of the struts 44 support directly adjacent portions of the bottom plates 20.

As a constructional aid in the field welding of the tank's bottom I find it a convenience to use a shaped welding bar 49 supported on the struts 44 and extending along the bottom edge of the plates 13 to the vicinity of the vertices 14 of the plates 13. The bar acts as a chill-plate to prevent burning through when welding this bottom seam.

In order to equalize the fluid pressures throughout the tank 10 I provide orifices 50 near the top and bottom of each of the plates 13. These orifices thus communicate the cells 11 and 12 each with the other for the purpose stated.

The terms and expressions which I have employed are used as terms of description and not of limitation and I have no intention, in the use of such terms and expressions, of excluding any equivalents of the features thereof, but recognize that various modifications are possible within the scope of the invention claimed.

Having thus described my invention, what I claim as new and desire to secure by Letters Patent is:

1. A cellular tank construction comprising a central cell having vertical peripheral walls forming an equilateral triangle, and three surrounding segmental cells each comprising a vertical circular wall, and a vertical chordal wall coincidental with one of said peripheral walls; the vertices of said peripheral walls and the centers of said circular walls lying at equal distances alternately on a circle whose center is the geometric center of said construction and of said central cell, and walls closing the tops and bottoms of each of said cells.

2. A cellular tank construction comprising a central cell having vertical peripheral walls forming an equilateral triangle, and three surrounding segmental cells each comprising a vertical circular wall, and a vertical chordal wall coincidental with one of said peripheral walls, and walls closing the tops and bottoms of each of said cells, each of said segmental cells comprising basically structurally correlative surfaces of revolution about their respective vertical axes and forming in assembly with said central cell a geometric pattern in which the vertices of said peripheral walls and the axes of said segmental cells lie at equal distances alternately on a circle whose center is the geometric axis of said construction and of said central cell.

3. A cellular tank construction comprising a central cell having vertical peripheral walls forming an equilateral triangle, and three surrounding segmental cells each comprising a vertical circular wall, and a vertical chordal wall coincidental with one of said peripheral walls, and walls closing the tops and bottoms of each of said cells, each of said segmental cells comprising basically structurally correlative surfaces of revolution about their respective vertical axes and forming in assembly with said central cell a geometric pattern in which the vertices of said peripheral walls and the axes of said segmental cells lie at equal distances alternately on a circle whose center is the geometric axis of said construction and of said central cell, whereby the said surfaces of revolution will intersect each other respectively along coincidental points in the vertical plane of the respective said peripheral walls and will thus demarcate the boundary periphery of said peripheral walls.

4. A cellular tank construction as claimed in claim 1 in which additional structural means for stiffening and supporting the tank shell are provided whereby usual allowable deformations resulting from contained fluid pressures are substantially resisted.

5. A cellular tank construction as claimed in claim 1 in which a ferro-concrete supporting foundation is provided comprising segmental circular sills having a chordal opening and having centers coincidental vertically with the centers of said circular walls, and struts connecting the ends of said sills defining said opening, the said struts being axially positioned in the vertical plane of said peripheral walls, the upper surfaces of said sills and said struts having direct supporting contact with the bottoms of said cells.

6. A cellular tank construction as claimed in claim 1 in which a ferro-concrete supporting foundation is provided comprising circular sills having a chordal opening and struts connecting the ends of said sills defining said opening, the upper surfaces of said sills and said struts having direct supporting contact with the bottoms of said cells.

HANS HAMMEREN.